(12) United States Patent
Bullock

(10) Patent No.: US 7,726,920 B2
(45) Date of Patent: Jun. 1, 2010

(54) MODULAR ADJUSTABLE LOAD STABILIZER METHOD AND APPARATUS

(76) Inventor: Matthew Bullock, 6314 Georgetown Pike, McLean, VA (US) 22101

( * ) Notice: Subject to any disclaimer, the term of this patent is extended or adjusted under 35 U.S.C. 154(b) by 366 days.

(21) Appl. No.: 11/669,527

(22) Filed: Jan. 31, 2007

(65) Prior Publication Data

US 2008/0181743 A1     Jul. 31, 2008

(51) Int. Cl.
*B61D 45/00* (2006.01)
(52) U.S. Cl. ..................................................... 410/118
(58) Field of Classification Search ................. 410/118, 410/121, 122, 123, 126, 143–150, 151, 152, 410/153
See application file for complete search history.

(56) References Cited

U.S. PATENT DOCUMENTS

| | | | |
|---|---|---|---|
| 3,612,463 A | 10/1971 | Grant | |
| 4,553,888 A | 11/1985 | Crissy et al. | |
| 5,018,918 A * | 5/1991 | Jacobs et al. | 410/145 |
| 5,037,256 A | 8/1991 | Schroeder | |
| 5,062,751 A | 11/1991 | Liebel | |
| 5,132,156 A | 7/1992 | Trassare, Jr. et al. | |
| 5,139,842 A | 8/1992 | Sewell | |
| 5,484,643 A | 1/1996 | Wise et al. | |
| 5,697,742 A * | 12/1997 | House | 410/127 |
| 5,846,038 A | 12/1998 | Bostelman | |
| 5,855,459 A | 1/1999 | Krier et al. | |
| 5,947,666 A * | 9/1999 | Huang | 410/151 |
| 6,238,154 B1 * | 5/2001 | DaPrato | 410/151 |
| 6,371,422 B1 * | 4/2002 | St. Martin et al. | 248/200.1 |
| 6,419,434 B1 * | 7/2002 | Rahn | 410/151 |
| 6,435,787 B1 | 8/2002 | John | |
| 6,527,488 B2 | 3/2003 | Elze et al. | |
| 6,533,513 B2 | 3/2003 | Kanczuzeswski et al. | |
| 6,568,636 B2 | 5/2003 | Fitzgerald et al. | |
| 7,290,742 B2 * | 11/2007 | Wang | 248/200.1 |
| 7,322,781 B2 * | 1/2008 | Bullock | 410/123 |
| 7,374,380 B2 * | 5/2008 | Huang | 410/151 |
| 2007/0048104 A1 * | 3/2007 | Scott | 410/151 |

FOREIGN PATENT DOCUMENTS

DE     3316954 A1 *  11/1983

* cited by examiner

*Primary Examiner*—Hilary Gutman
(74) *Attorney, Agent, or Firm*—Bradford Kile; Kile Goekjian Reed & McManus

(57) ABSTRACT

A method and apparatus for stabilizing cargo within a transport container. First and second tubular elements are provided having generally cylindrical bodies and bearing members are mounted at a terminal end which can react against opposing surfaces within the transport container and stabilize cargo within the container. An extension mechanism allows for the extension and selective translation between the first and second tubular members allowing the apparatus to extend and fill the space between opposing surfaces within the transport container and stabilize the cargo. At least one of the tubular members is composed with two elongate halves. A method for stabilizing cargo within a transport container includes providing an extensible load stabilizer having first and second tubular elements, each having a bearing member. Forming at least one of the tubular members by mating together two tubular halves. The method further includes positioning the load stabilizer between opposing surfaces within the transport container and extending the tubular members with respect to each other, and stabilizing a surface of cargo against an opposing surface.

38 Claims, 14 Drawing Sheets

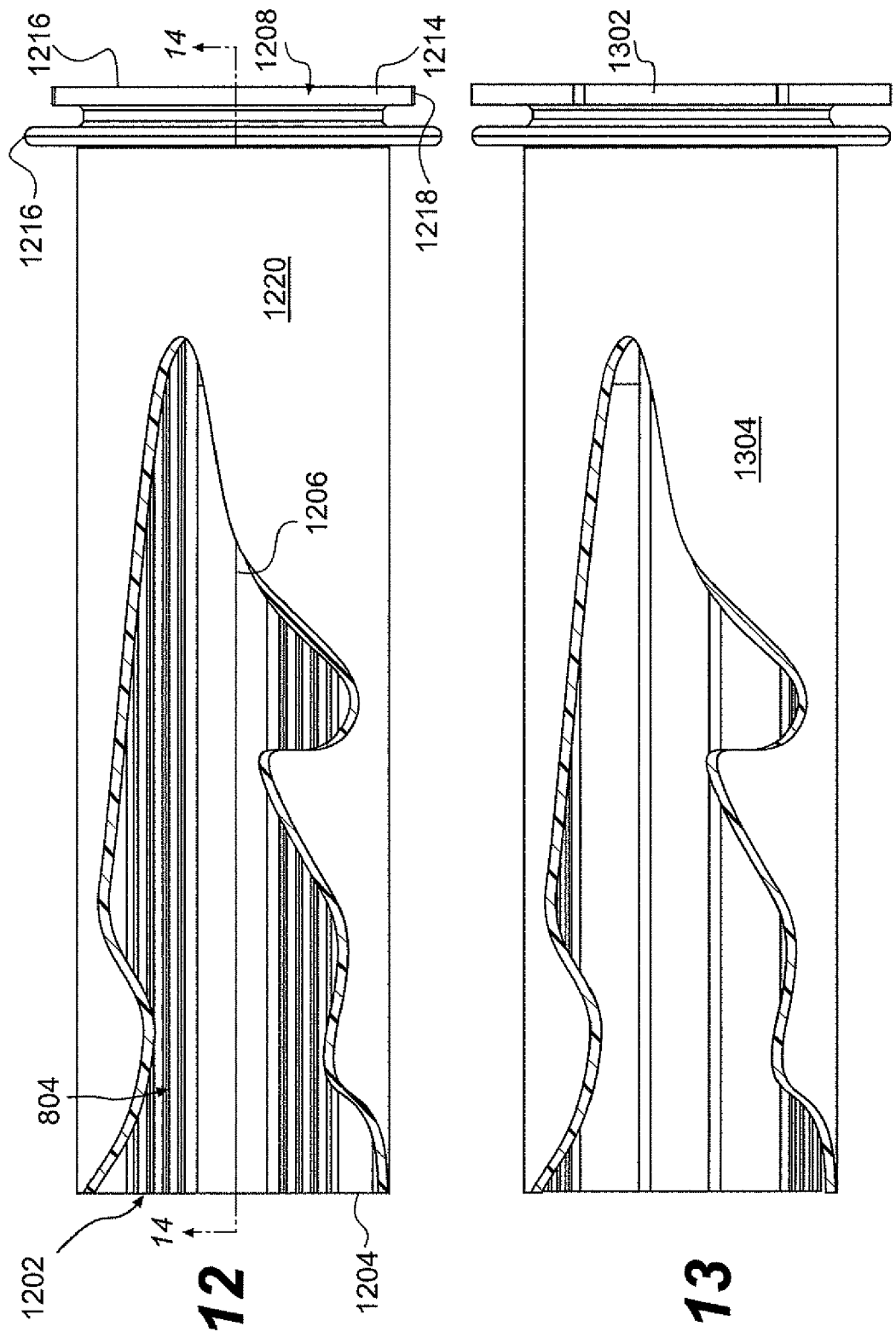

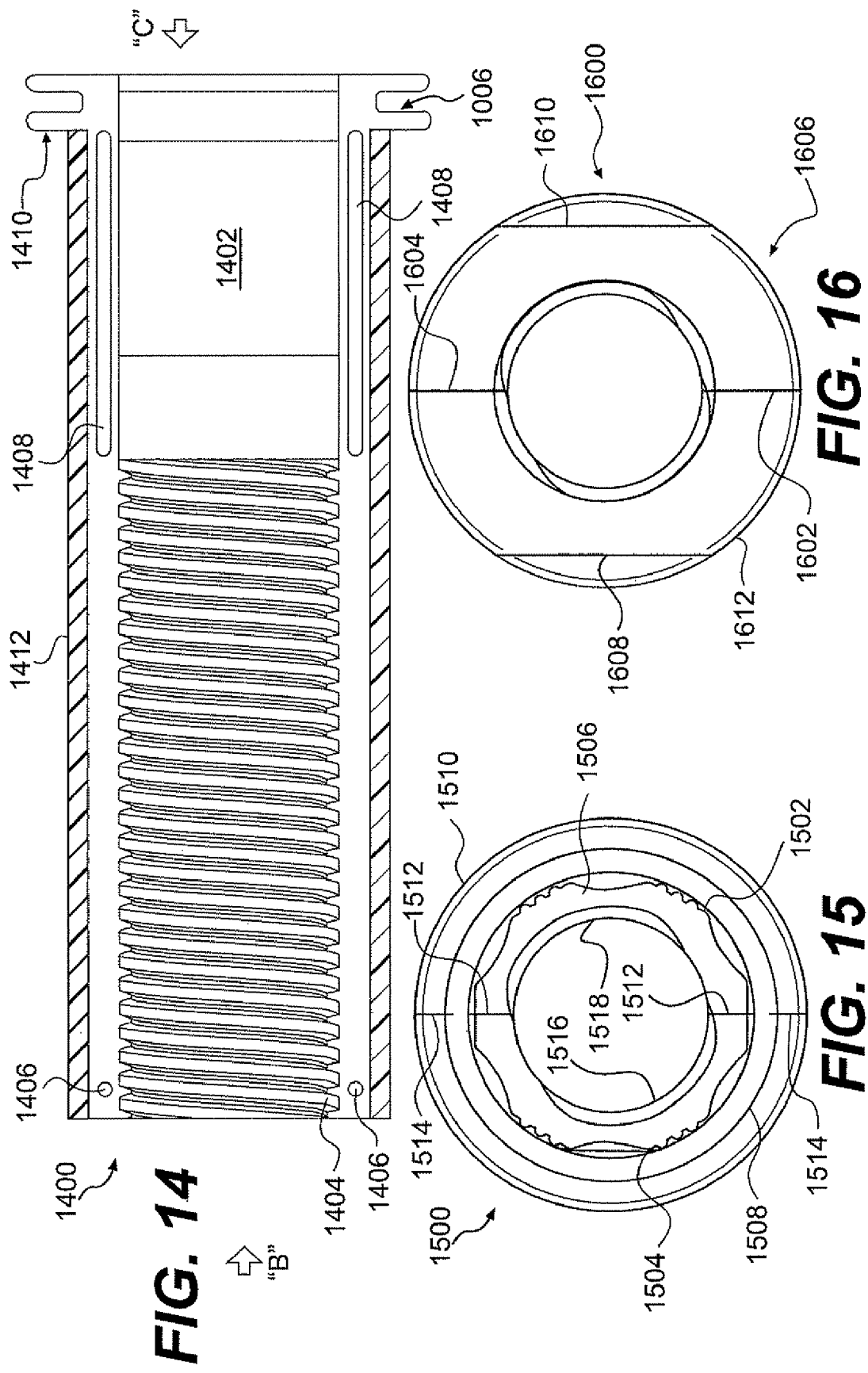

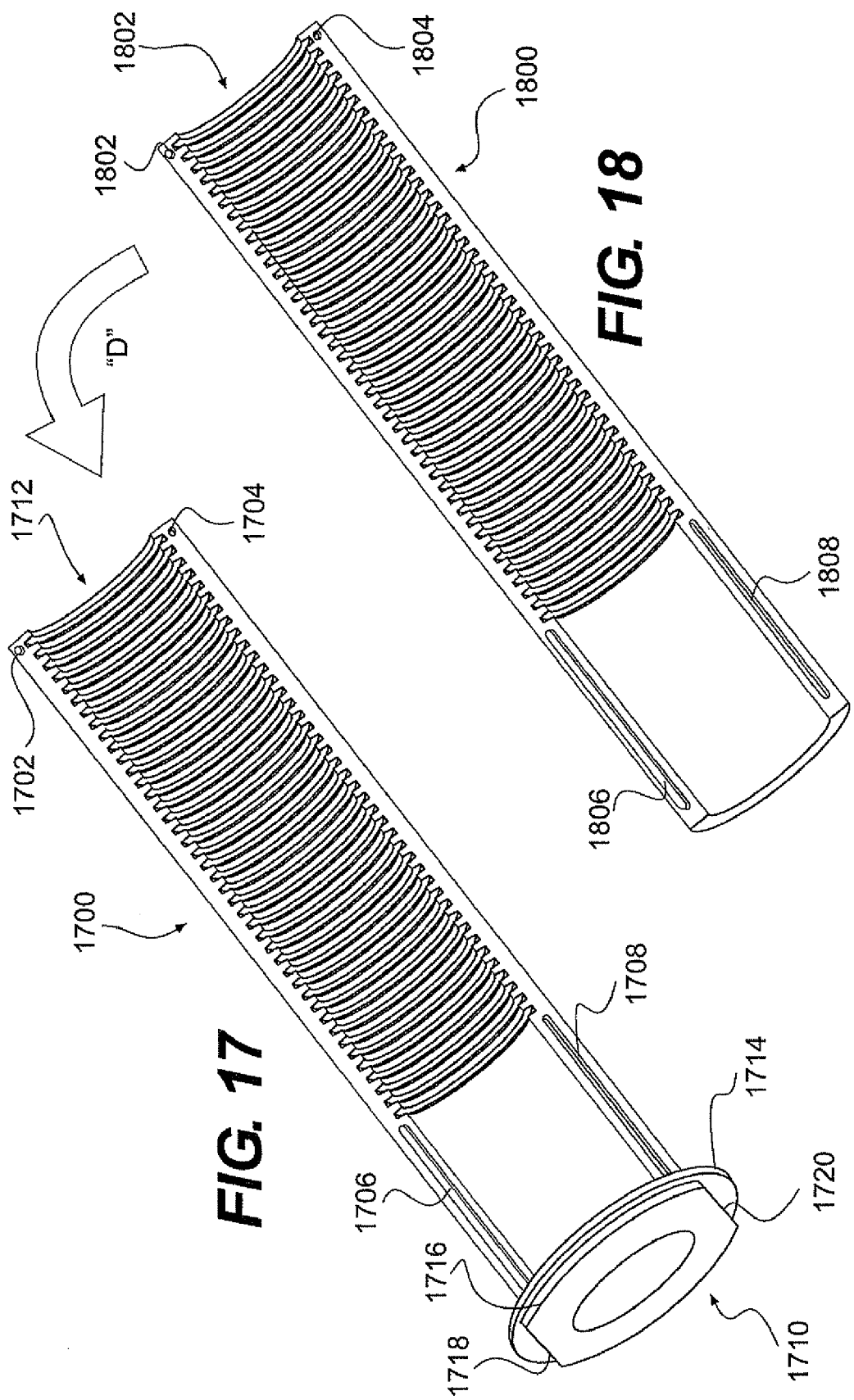

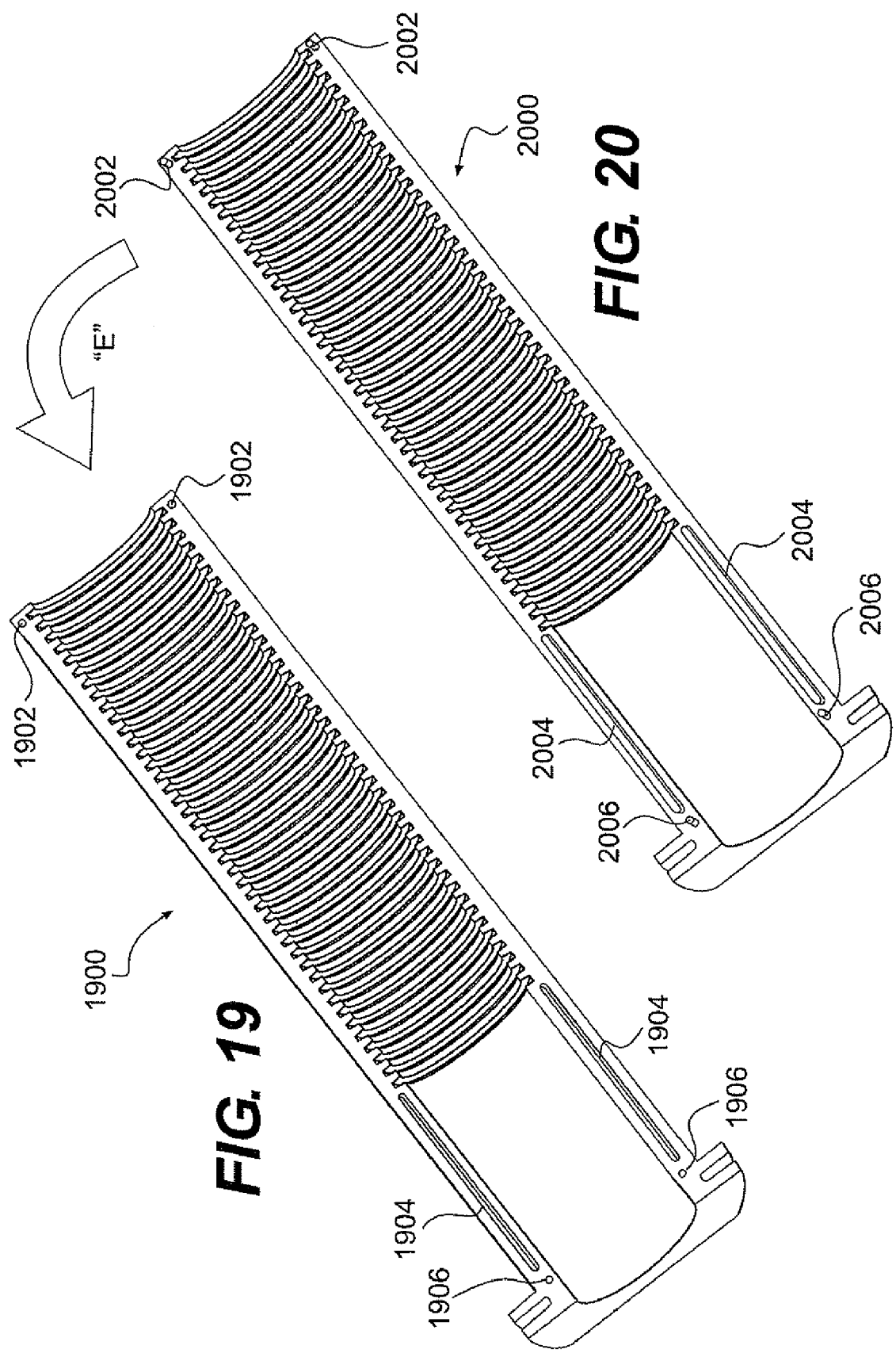

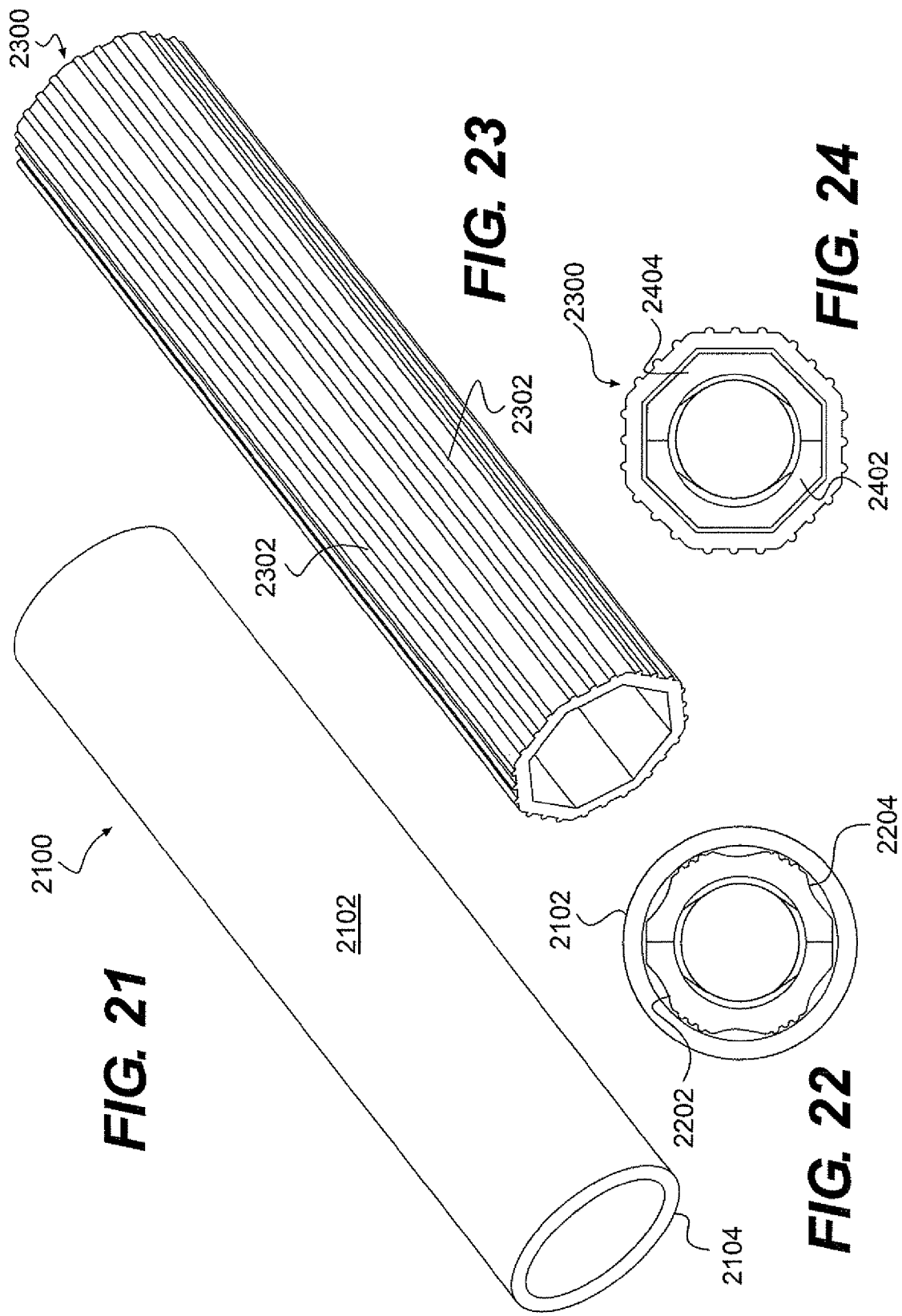

MODULAR ADJUSTABLE LOAD STABILIZER METHOD AND APPARATUS

RELATED PATENTS

This application relates to U.S. Pat. No. 6,089,802 entitled "Cargo Restraint System for a Transport Container" issued on Jul. 18, 2000; U.S. Pat. No. 6,227,779 entitled "Cargo Restraint Method for a Transport Container" issued on May 8, 2001; U.S. Pat. No. 6,607,337 entitled "Cargo Restraint System" issued on Aug. 19, 2003; to U.S. application Ser. No. 11/127,193 filed May 12, 2005 and entitled "Adjustable Load Stabilizer Method and Apparatus" application Ser. No. 11/459,356 entitled "Adjustable Load Stabilizer Apparatus Method and Apparatus" filed Jul. 23, 2006 and application Ser. No. 11/459,357 entitled "Adjustable Load Stabilizer Apparatus Method and Apparatus" filed Jul. 23, 2006 all of common inventorship with the subject application. The disclosure of applicant's prior application Ser. Nos. 11/127,193; 11/459,356 and 11/459,357 are hereby incorporated by reference as though set forth at length.

BACKGROUND OF THE INVENTION

This invention relates to an improved method and apparatus for stabilizing cargo during transportation. More particularly, this invention relates to a novel, modular, method and apparatus for stabilizing and restraining undesired movement of drums, boxes, rigid and flexible containers, palletized or not palletized, within the interior of a transport container or the like with respect to each other and/or with respect to an internal wall surface of the container.

Most shipments for transport are placed in enclosures such as ship cargo holds, intermodal containers, truck trailers, truck bodies, railroad box cars, and the like. Examples of cargo in containment enclosures include fifty five gallon closed head drums, super sacks or plastic reinforced bags, plastic wrapped bundles, cased goods, metal coils, specialty heavy paper rolls, plastic or metal containers mounted on pallets, etc. Although each individual component of cargo may be quite heavy and stationary at rest, the mass of a transport load can produce considerable momentum force as a ship, railroad car, truck trailer or truck body is placed in motion, stops, or changes direction.

During ocean transport cargo within cargo holds or intermodal containers are subjected to wave forces including: yaw, pitch, heave, sway, and surge. Depending upon weather conditions and the size of the vessel, cargo can experience various magnitudes of shifting forces throughout the course of a transoceanic voyage.

In another transport context, railroad trains are made-up by individual box cars being rolled together in a switching yard. When a railroad car is rolled into a stationary string of cars, the impact causes the car couplings to lock together with a jolt. This impact can apply a significant force to cargo within the rail car. Moreover, during transport, railroad cars and overland transport vehicles are subject to braking forces, bumps, centrifugal forces on curves, vibration, dips in the track or road, swaying, run-in or run-out forces, etc.

In overland truck/trailer transport there are frequent brake and acceleration forces imparted to the trailer and its contents, certrifical forces around curves, turning forces, uneven road surfaces, roadway transition junctions, roadway grades, etc.

Each of these forces has the potential to impart a substantial force to cargo during transport. When cargo contacts other cargo or the interior walls or doors of a container, the force necessary to reduce its momentum to zero must be absorbed by the goods and/or the container. Such forces can result in damage to the cargo, damage to the interior walls or doors of the container, damage to the cargo packaging, and may even create dangerous leaks if the cargo is a hazardous material. Accordingly, it is undesirable to permit cargo to gain any momentum independent of other cargo or a transport container. This can be accomplished by stabilizing the cargo within the container with respect to other cargo and/or the internal walls of the container so that the cargo and container are essentially united and operationally function as a single object during transport.

In order to stabilize cargo with respect to other cargo and the internal walls of a transport container or cargo hold, various forms of load containments, load spacers and void fillers have been used to fill the spaces between cargo and between cargo and the internal walls of an intermodal container, box car, cargo hold, truck trailer, etc. Often, load containment enclosures are secured to the floor or sides of the transport container and prevented from moving with respect to each other by specially fabricated wood or steel framing, floor blocking, rubber mats, steel strapping, or heavy air bags. A variety of dunnage materials and void fillers has been used to prevent the movement of cargo with respect to other cargo and the internal walls of the transport container. Each of these previously known systems has limitations associated with cost, lack of strength, amount of labor required for installation, time expended for installation, lack of flexibility, securement integrity, and transportability and storage of spacer elements, etc. Still further a capacity for reuse would be a desirable aspect of a spacer system.

In the past, various dunnage materials have been utilized within transport containers to eliminate unwanted movement or shifting of a load. Drums, boxes, or other containers have been restrained in several different ways. Primarily, cargo has been stabilized by the use of void fillers such as collapsible cardboard frames or cells. These systems use strips of corrugated cardboard configured and assembled to expand into solid rectangular frames or cells of various forms and sizes and incorporate honeycomb and/or diamond-shaped cells for space and strength considerations. These systems while useful for known rectangular voids can exhibit impaired performance due to size and/or dimension variance. Moreover curved surfaces can not be accommodated well with rectangular shaped void fillers. The difficulty in applying various rectangular units to irregular shapes and the on site adjustment for varying sizes of voids to be filled, the unsuitability of corrugated board to absorb strong compression forces, and the use of materials not fully resistant to fluids and condensation moisture can impair use of this type of dunnage void filler system.

Other known means of restraint such as the use of inflatable dunnage bags used alone or in combination with collapsible void fillers have tended to exhibit the disadvantage that air bags are subject to rupturing, leakage and loss of air pressure, or simply contraction and securement loosening in low temperature environments.

In addition to the above, other restraining systems known in the past often required additional elements and equipment which tended to be cumbersome to store, arduous to handle and/or install, and often required a degree of skilled labor in application.

Finally, in certain instances mere wood block and bracing has been used to fill voids and secure loads; however, wood bracing is somewhat time consuming to install and often requires skilled or semi-skilled labor which is often contracted out to third parties. In addition certain wood materials are not suitable for international transport without fumigation which increases the overall cost of the securement system.

In view of the above and other limitations, a need exists for securing cargo in cargo holds, transport containers, box cars, truck trailers and the like that is functionally effective; cost-efficient; easy to assemble, transport, use and reuse; and labor-efficient. Still further a need exists for load stabilization systems that have enhanced strength characteristics under a variety of environments, exhibit flexibility for loads of various types and sizes, limit cargo shifting within a container and is operationally functional even with fluid contact and/or in condensation conditions. Still further a need exists for void fillers that are efficient to store and transport, easily assembled with unskilled labor and are capable of a degree of reuse.

The problems suggested in the preceding are not intended to be exhaustive but rather are among many which may tend to reduce the effectiveness of load stabilizer methods and apparatus appearing in the past. Other noteworthy problems may also exist; however, those presented above should be sufficient to demonstrate that load stabilizing systems appearing in the past will admit to worthwhile improvement.

SUMMARY OF THE INVENTION

One embodiment of the invention comprises a method and apparatus for stabilizing cargo within a ship hold, transport container, box car, truck trailer, and the like with respect to other cargo and/or an internal wall of the container by the selective application of mutually extendible void filler cylinders wherein at least one of the cylinders is modular. More specifically, stabilization is achieved by application of extension members, which are adjustable with respect to each other. Each extension member is coupled to a base which is designed to fit into an abutment or bearing member for direct or indirect positioning against a face of cargo or an internal wall of a transport container. Securement is achieved by extending the two extension members with respect to each other to fill in a void between the face of opposing cargo surfaces or an internal wall of a container and a cargo surface, or the like. A locking mechanism may be advantageously used to hold the two extension members in position.

THE DRAWINGS

Other aspects of the present invention will become apparent from the following detailed description of embodiments taken in conjunction with the accompanying drawings wherein:

FIG. 12 is a side view, partially broken away, of a female tubular member with a means for maintaining engagement of the two portions of the female member by a retaining or locking sleeve surrounding the female tubular member;

FIG. 13 is another side view similar to FIG. 12 but rotated ninety degrees to disclose interior detail of the female member within a locking sleeve;

FIG. 14 is a cross-sectional view of the female member taken along section lines 14-14 in FIG. 12 in accordance with one embodiment of the invention;

FIG. 15 is an end view of the female tubular member taken in the direction of arrow "B" in FIG. 14;

FIG. 16 is an opposite end view of the female tubular member taken in the direction of arrow "C" in FIG. 14;

FIG. 17 is an axonometric view of one half of a female tubular member that is longitudinally divided in accordance with one embodiment of the invention;

FIG. 18 is an axonometric view of the other half of the female tubular member shown in FIG. 17;

FIG. 19 is an axonometric view of an alternative embodiment of one half of the female tubular member that is longitudinally divided along its length;

FIG. 20 is an axonometric view of the other half of the female tubular member that is longitudinally divided along its entire length;

FIG. 21 is an axonometric view of a cylindrical sleeve or locking member for the two halves of a female tubular member;

FIG. 22 is an end view of the locking sleeve of FIG. 21 positioned around an interior female member which has an octagonal exterior configuration and a circular threaded internal shape such as shown in FIGS. 12 and 13;

FIG. 23 is an axonometric view of an alternative cylindrical locking sleeve that has an octagon exterior configuration;

FIG. 24 is an end view of the locking sleeve of FIG. 23 positioned around the halves of a female member with a similar octagonal shape;

DETAILED DESCRIPTION

Context of the Invention

Figure 1:
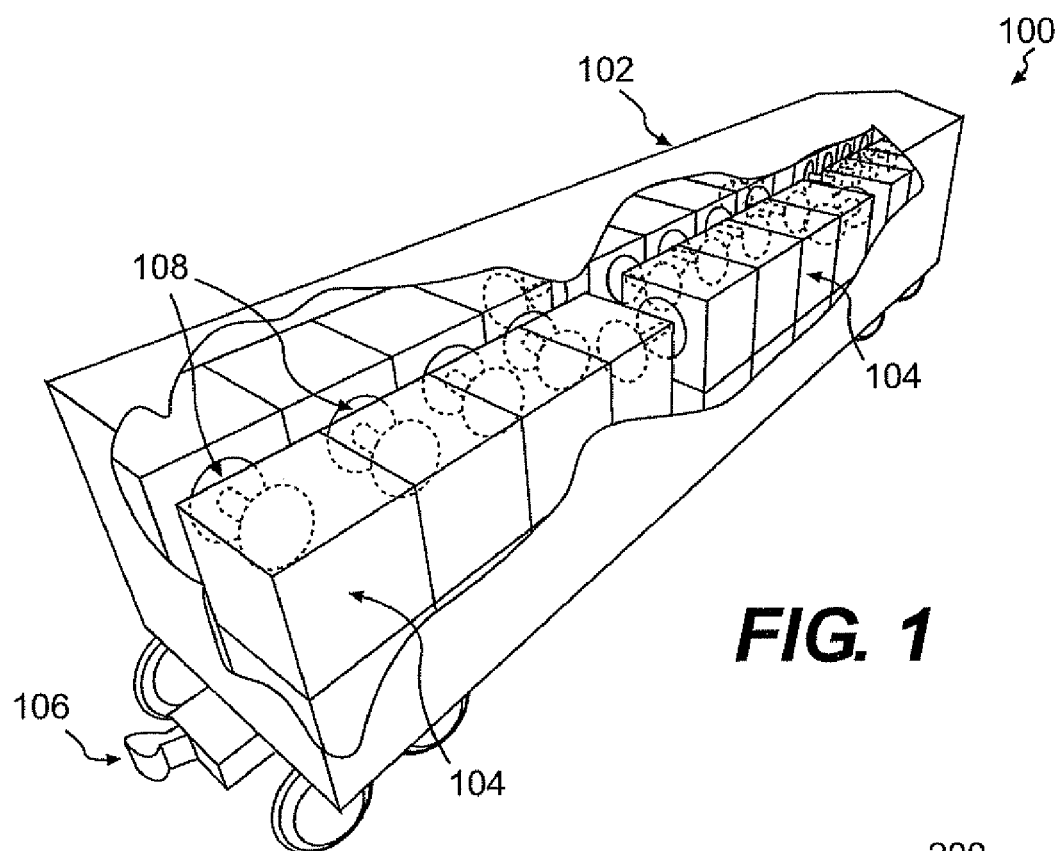
FIG. 1 is an axonometric view showing the interior of a railcar with cargo stabilized, both laterally and longitudinally, within the railcar in accordance with the subject invention.

Turning now to the drawing, FIG. 1 shows an axonometric view of an operating environment 100 of the invention. In this, a railcar 102, such as a box car, is shown as a type of container that may be encountered. Railcars are used to transport a wide range of materials including many that must be protected from impact against the railcar walls as well as other cargo. Cargo 104 must be protected from a variety of shifting forces during transit as noted above. One particular force encountered in railcars specifically is the impact force created when two railcars are "humped" or handeled by a switching engine in order to make up a train and secure a solid coupling connection via a coupling assembly 106. In addition run-in and run-out forces occasioned over grades can be substantial as well as car sway occasioned by uneven tracks. The form of a rail container 102 shown here is merely illustrative and the subject invention can be used to advantage in ship cargo holds, intermodal containers, and all other forms of cargo containers.

A partially cut away portion of FIG. 1 depicts various size and shapes of cargo 104, which are stabilized against each other or against an internal wall surface of the container 102 by modular load stabilizers 108 in accordance with the subject invention.

Figure 2:
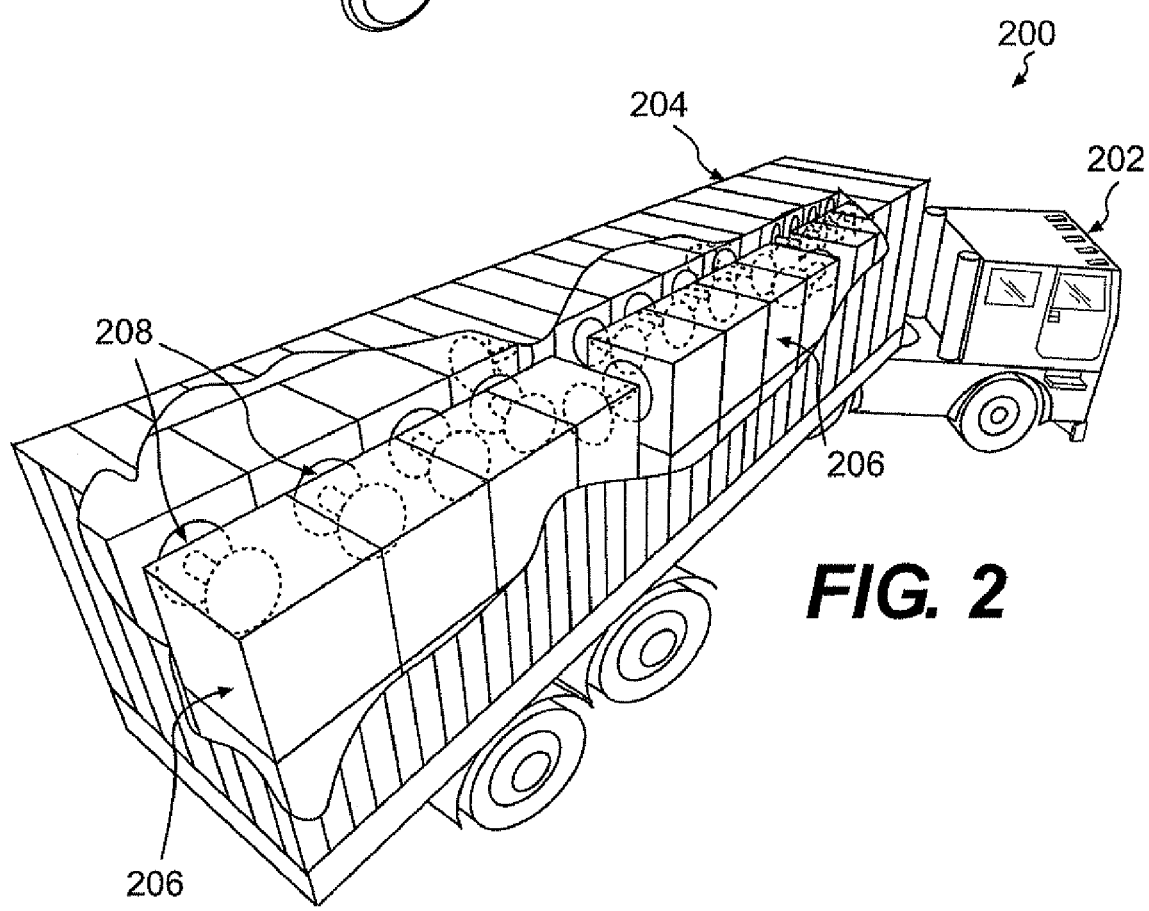
FIG. 2 is an axonometric view showing the interior of a transport container secured to a flatbed truck or truck trailer, with cargo stabilized within the container in accordance with the subject invention.

FIG. 2 shows another, illustrative, operational context 200 of the invention. In this context, container 204 is secured to a trailer towed by tractor 202. Cargo 206 within the container is subject to a wide range of overland road forces. Modular void fillers 208, in accordance with the subject invention, serve to provide both lateral and longitudinal securement of the cargo from impact with other cargo and with the walls of the container 204.

Modular Void Filler and Load Stabilizer

Figure 3:
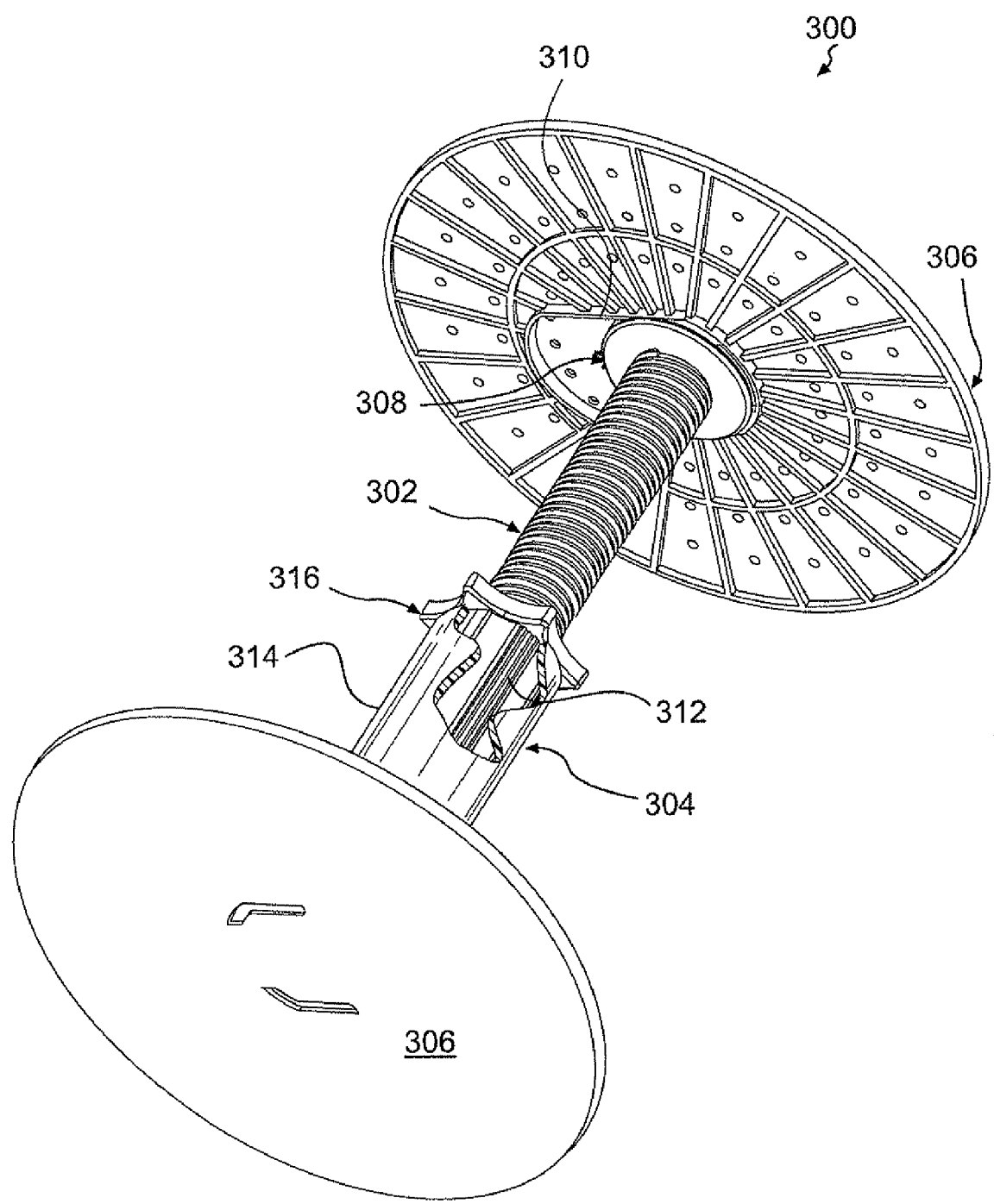
FIG. 3 is a perspective view of one embodiment of the present invention showing a tubular male member, a modular, female, tubular member, and two bearing elements.

FIG. 3 is a perspective view of one embodiment of the subject modular void filler invention 300. In this, tubular member 302 is a male member which is operably inserted into a female, counterpart, tubular member 304. In this embodiment male member 302 is externally threaded to match internal threads of female member 304. Due to this threading, member 302 can be extended or retracted longitudinally by turning either or both of members 302 and 304 which facilitates selective translation between members 302 and 304. In one embodiment, the members are double threaded and two rows of threads start in diametrically opposing positions. In another embodiment three rows of threads can be started at the same time. Depending on the pitch of the threads and the coefficient of friction of the material and weight of the unit the two members may be advantageously self separating by gravity. This means that the device 300 is turned on its end and the members 302 and 304 will rotate relative to one another, the bottommost member will continue to turn until disengaged from the topmost member.

Bearing members 306 comprise the surfaces that will directly or indirectly abut against or contact cargo, cargo containers or the walls of a transport container. These bearing members can be structurally the same and are selectively removable in one embodiment and are connected at point 308 to members 302 and 304 (connection point on member 304 not shown in FIG. 3). The bearing member 306 is released from the tubular member 302 by sliding it out of securing slots 310 that are shown in detail detailed below. They also may be screwed or bolted into position or turned into position and locked with a ratchet type mechanism or pushed axially into slots within the end members 306. In other words, any securing method and mechanism that reliably attaches the tubular member to the bearing member is appropriate.

In this embodiment the female tubular member 304 is formed in two longitudinally extending parts (note one element 312 that will be discussed in detail below) and the female tubular member 304 is fitted with a cylindrical locking sleeve 314 that surrounds the tubular female member.

Once extended, void filler 300 holds it position by friction and may be locked into a fixed position by a locknut 316. Locknut 316 is moved into position with a tool or by hand and secured against the end of female tubular member 304 to prevent counter rotation and disengagement of the void filler from cargo within a transport container.

With the detachable modular embodiment of this invention an additional benefit is realized of being efficient to ship to a use destination. For example, drop-down type cardboard void fillers can be shipped at approximately 100 pieces per pallet. The subject invention can be shipped with more than 1000 pieces per pallet. This is due to its modular configuration and the ability to stack the bearing member elements and closely pack the tubular members as modular elements as will be discussed below.

Figure 4:
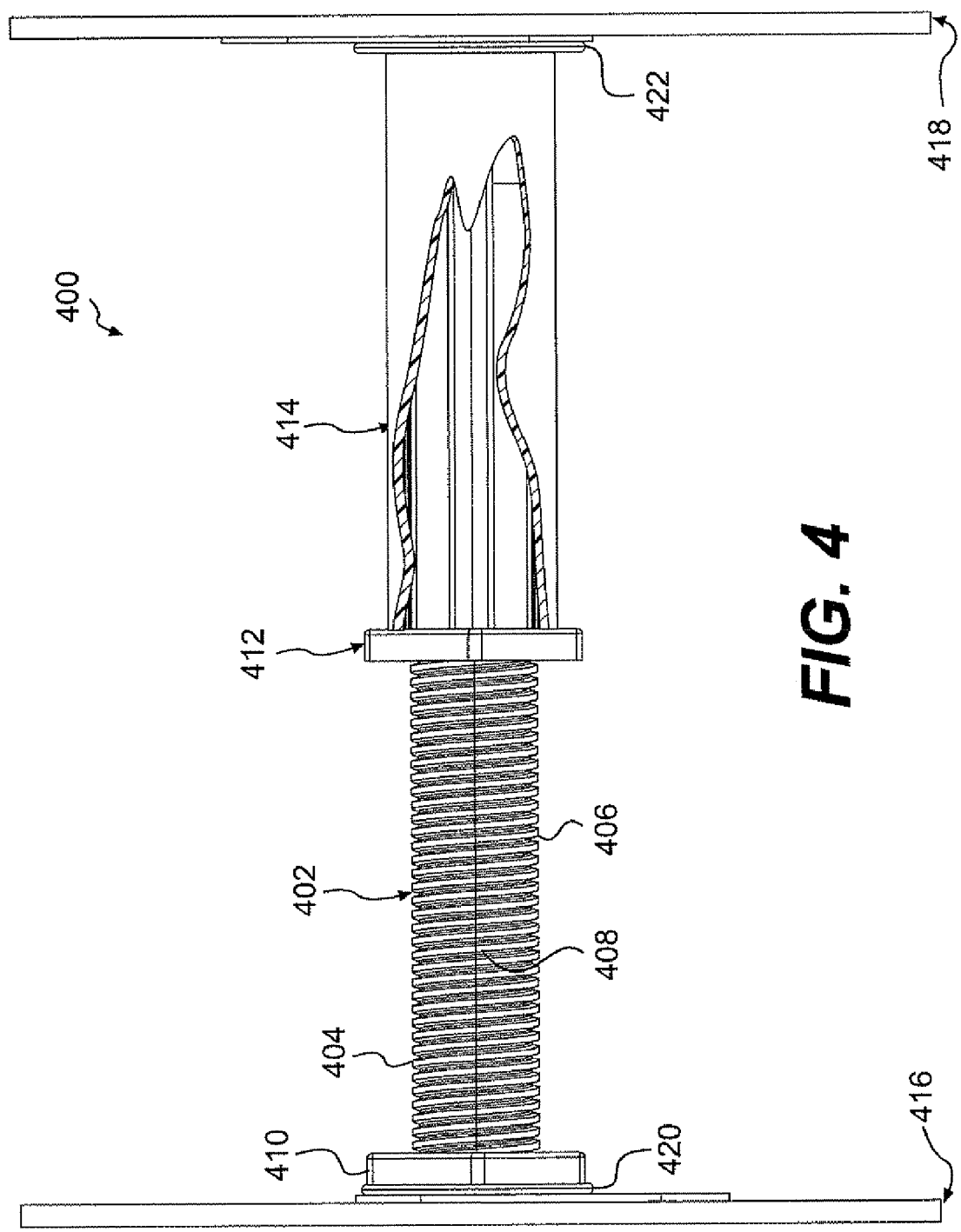
FIG. 4 is a side view of the embodiment of the invention depicted in FIG. 3.

FIG. 4 is a side view of one embodiment of the void filler 400 of the subject disclosure. In this embodiment male tubular member 402 is formed from two sections 404 and 406. The two sections that are longitudinally divided along division line 408 are held together by a first retaining member 410 and a second retaining and locking member 412. The male tubular member 402 inserts into tubular member 414 and is selectively telescoped by turning the two members relative to one another. Bearing members 416 and 418 are mounted on each end of the void filler and serve to provide load distributed engagement with cargo and with other cargo or a wall surface of a transport container to prevent damage of contents during shipping.

Tubular members 402 and 414 are attached to bases 420 and 422 respectively which are fashioned for sliding into a slot within the bearing members 416 and 418 respectively as will be discussed further below. Note that as above, any type of connection mechanism could be used here including permanent attachment.

The retaining member 412 also operably serves as a locknut to secure the two tubular members at a particular extension. When the proper expanse of the void filler 400 is reached, locknut 412 is turned into place and tightened either by hand or using a tool and prevents further movement of the tubular members with respect to one another. Note that this nut may be any configuration to fit any type of tightening tool or to be more easily tightened by hand.

Figure 5:
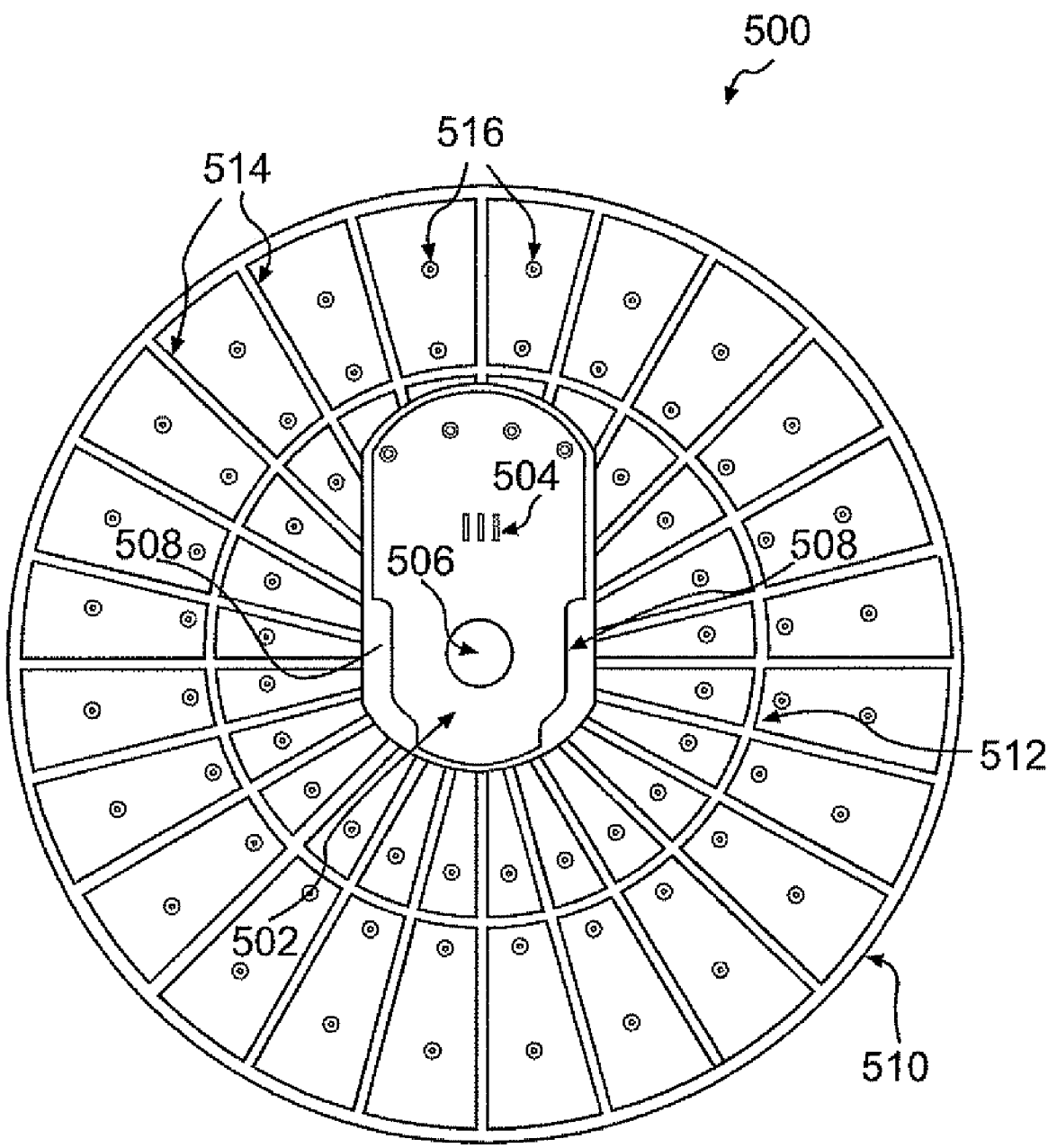
FIG. 5 is a view of one side of a base that is attached to one of the two tubular members.
Figure 8:
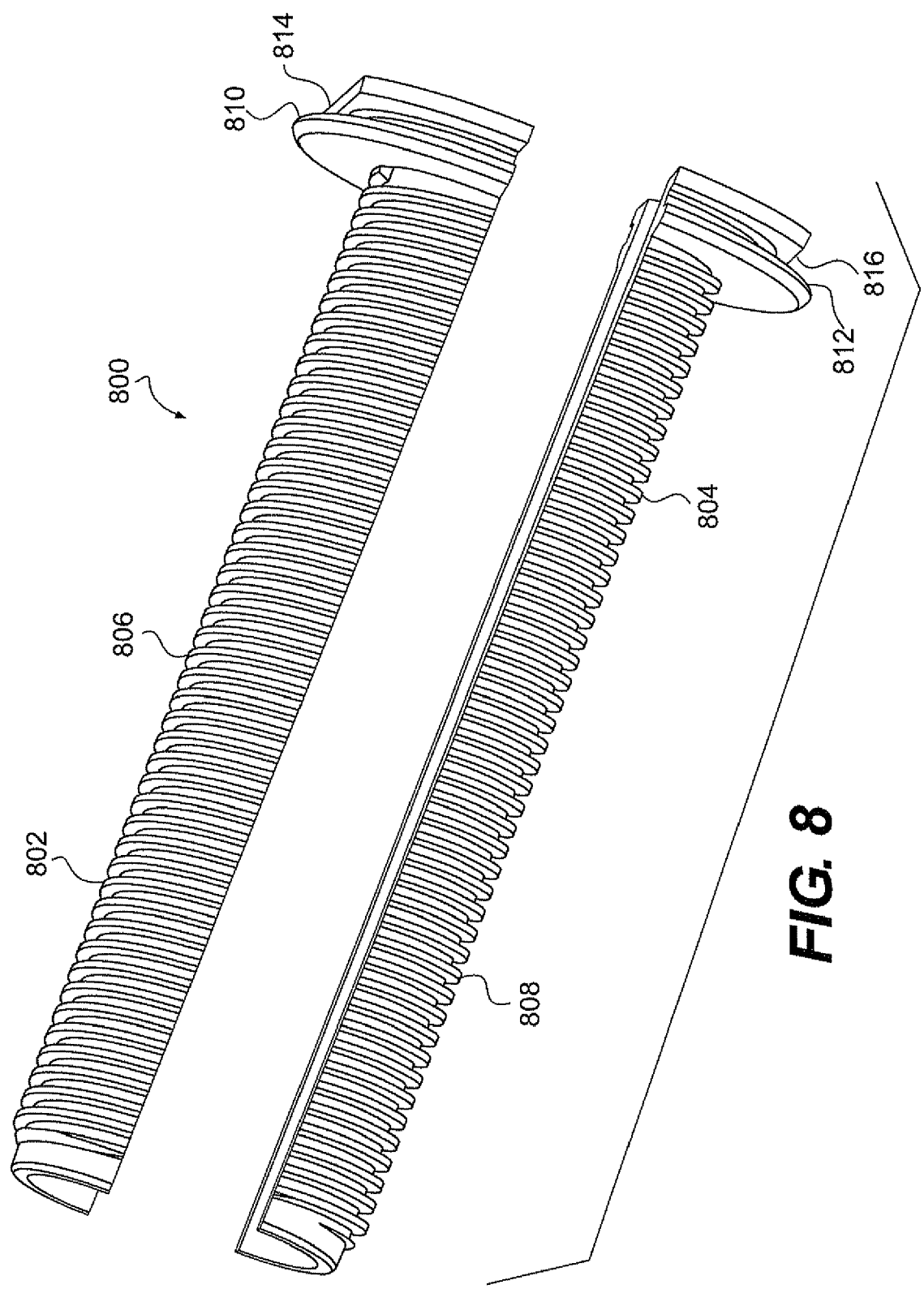
FIG. 8 is an exploded axonometric view of a male tubular member of a modular void filler molded in two sections that are mounted together to form a single male tubular member.

FIG. 5 is a detailed view of one of the end bearing members 500 showing the side facing toward the tubular members illustrated in FIG. 4. Tubular members, such as 402 and 414 are connected to a base element, such as illustrated in FIG. 8 and discussed below, which serves to attach the tubular members to the bearing member 500. In this, the base of a tubular member is placed over a ramp 504 and then it can be slid down into position 502 such that an edge of the base for the tubular member, to be detailed below, fits under rails 508. Once in position, ramp 504 ensure that the base of the tubular member will not inadvertently slide out of its attachment with the bearing member. Dimple 506 is slightly raised and gives additional snugness to the attachment of the base of the tubular member with a bearing member.

For added strength, the bearing member 500 may be fashioned with reinforcement rings 510 and 512 as well as radially extending ridges 514 which provide circumferential and radial stiffness for the bearing member 500. There is no limit to the number of rings or radial elements that may be used and the number is selected to provide both overall stiffness yet flexibility to conform to a degree with the surface of cargo to be engaged. Reinforcing elements 510, 512 and 514 are fabricated of the same material as the remainder of the bearing member 500 but are thicker and provide greater support. Nail or screw holes 516 allow the bearing member to be secured to any surface into which nails or screws can be used. These may be actual holes, or they may be portions of the bearing member that are thin with respect to the rest of the bearing member and allow nails or screws to be easily installed.

The subject invention may be constructed from a wide range of materials. In one embodiment, the tubular members are molded from a high density polyethylene and the bearing members are constructed of acrylonitrile butadiene styrene (ABS.) The subject invention can be constructed of any one, or any combination of the following materials: polyvinyl chloride (PVC), ABS, polyethylene, and polystyrene. This lists is not meant to be exhaustive, any material that provides the requisite strength and reliability for protecting cargo may be used to advantage.

Figure 6:
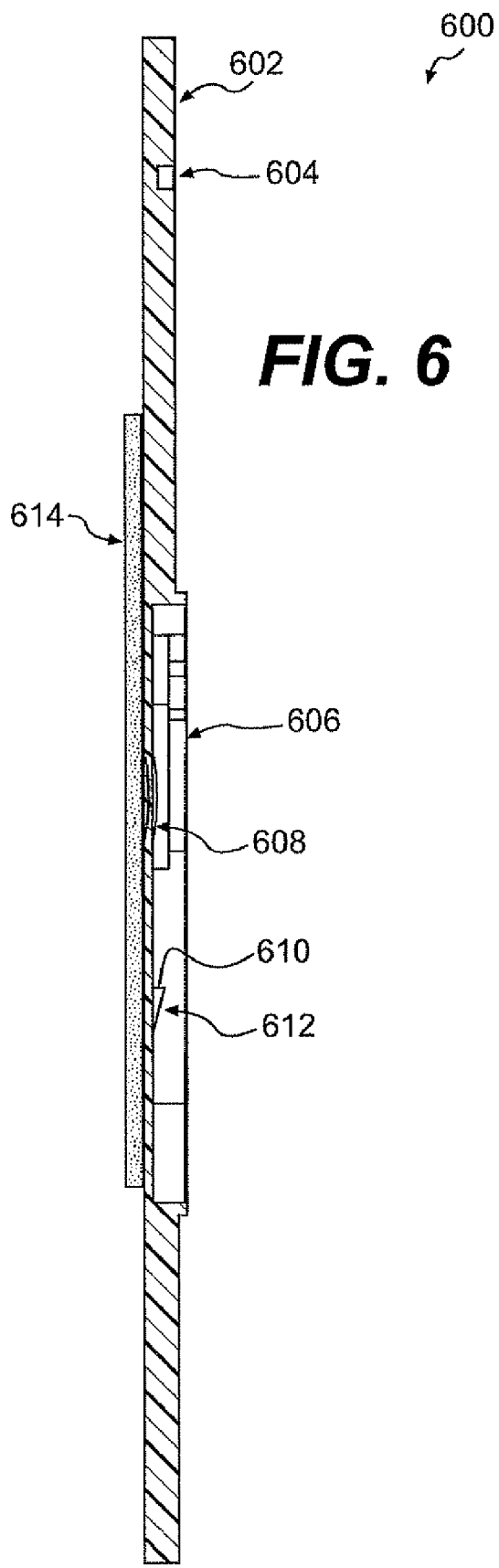
FIG. 6 is side view of the base depicted in FIG. 5 including a self adhering composition on one surface.

FIG. 6 shows a side view of a bearing member 600 such as the one shown in FIG. 5. A base portion of tubular members such as 402 and 414 fit within slot 606 and are held in place by the back end 610 of ramp 612. Dimple 608 also helps to hold the base of a tubular member securely in place. The base can be released by slightly bending the bearing member to slide the base of the tubular member over ramp 612. A nail or screw hole 604 is shown extending only partially through bearing member 600. A nail can be driven through this and into an opposing surface in order to retain the bearing member in place as desired. An optional adhesive element 614 allows the bearing member to be self-adhered to a container wall or cargo surface so that the bearing member can be facilely positioned by an operator working without assistance. Typically, this adhesive will be on a bearing member attached to a male tubular member so that the female member is free to turn and extend into an extended position.

Figure 7:
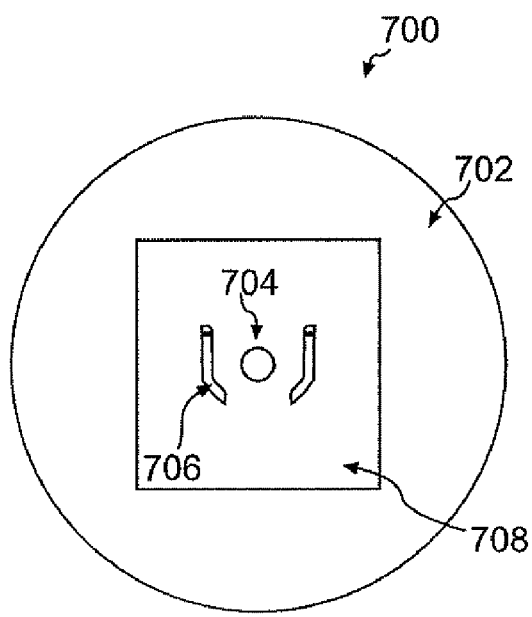
FIG. 7 is a view of an opposite side of the base shown in FIG. 5 but depicted on a reduced scale for ease of illustration.

FIG. 7 shows an opposite side of a bearing member 700 such as the one shown in FIGS. 5 and 6 that has been reduced in scale for ease of illustration. Surface 702 is smooth and is designed to be in abutting contact, directly or indirectly, with either a container wall surface or a surface of cargo within in the container. Dimple 704 and holes 706 are the reverse side of retention as securement members on the opposite side of the bearing member as previously discussed in connection with FIG. 5. The surface normally does not have any protrusions extending out that would damage the cargo. However, in one embodiment, a user may require a mechanical connection with the cargo. In this instance a protrusion extending from the bearing member could be used to secure the bearing member to cargo or a container surface. An optional adhesive element 708 allows the bearing member to be removeably affixed to either a cargo surface or a container wall for temporary securement and to facilitate installation of a void filler.

In the above referenced applications, that have been incorporated by reference, a male member was molded as a single piece or element of a void filler combination of components and a unitary male member is fully contemplated by the subject invention, however, in one embodiment of the subject invention a modular male member is envisioned. In this, FIGS. 8 through 11 disclose a tubular male member 800 that is composed with two elements 802 and 804 that are combined to form a tubular male member.

In FIG. 8, the male tubular member 800 is illustrated in an exploded arrangement wherein substantially identical halves 802 and 804 include a cylindrical portion that is threaded on its exterior surface as at 806 and 808 respectively and each half cylindrical element included a base or end element 810 or 812 which includes a slot 814 and 816 respectively designed to snuggly fit and attach to portions 508 of a bearing member 500 such as illustrated in FIG. 5.

Figure 9:
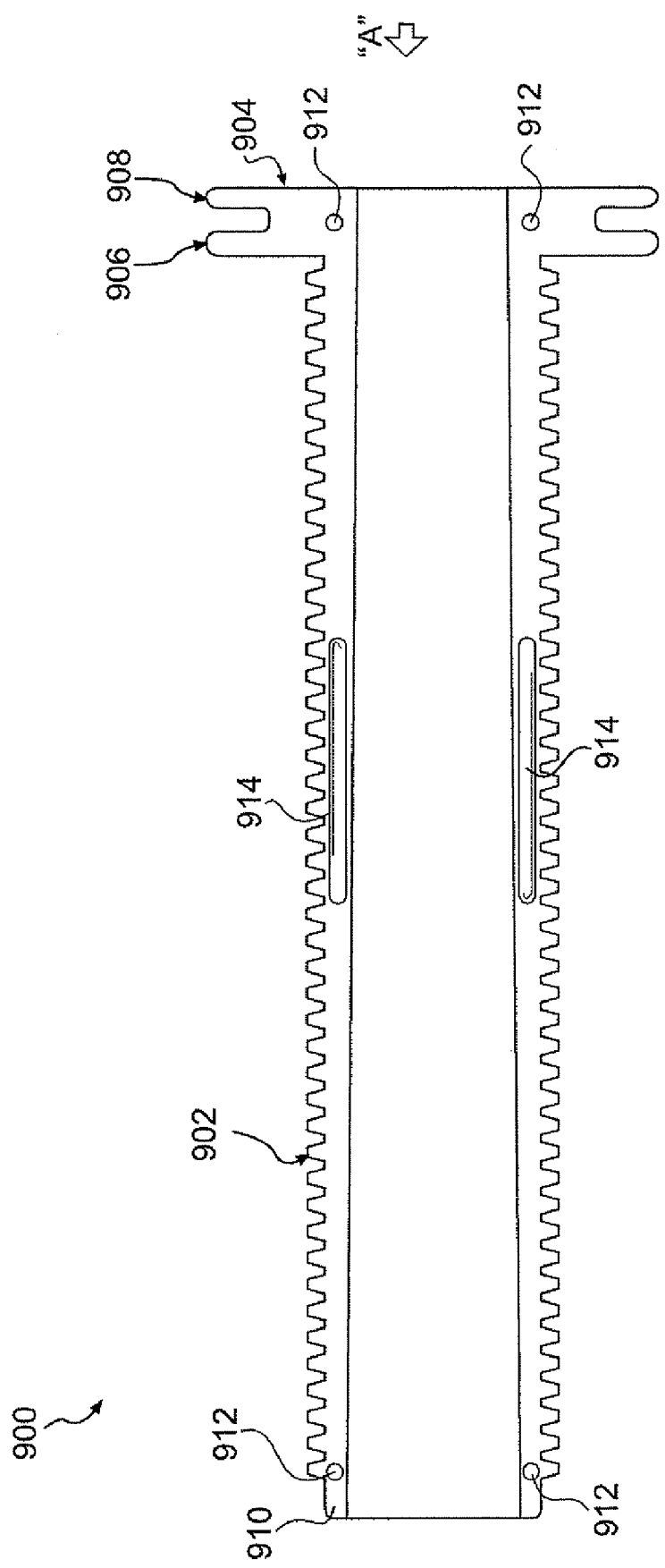
FIG. 9 is a side view of one section of the male member disclosed in FIG. 8.

FIG. 9 is a side view of one half 900 of a male tubular member. Threads 902 are molded on an exterior surface of the member 900 and may be of a single thread or a double or triple simultaneous run of threads. A base or end element 904 is molded with the longitudinal portion of the male member and is fashioned with lips 906 and 908 which fit into a slot formed on the bearing member 500 by arms 508 as shown in FIG. 5. In order for the two halves of the male member to be in fine registry the side walls 910 of the half of the male member is formed with one or more columns or stanchions 912 as shown in FIG. 9. In addition, one or more elongate raised ridges 914 may be molded into the side wall of the half 900 of a male member. In each instance of utilization of columns 912 or elongate ridges 914, corresponding recesses are formed within the side walls of an opposing half of a male member.

Figure 10:
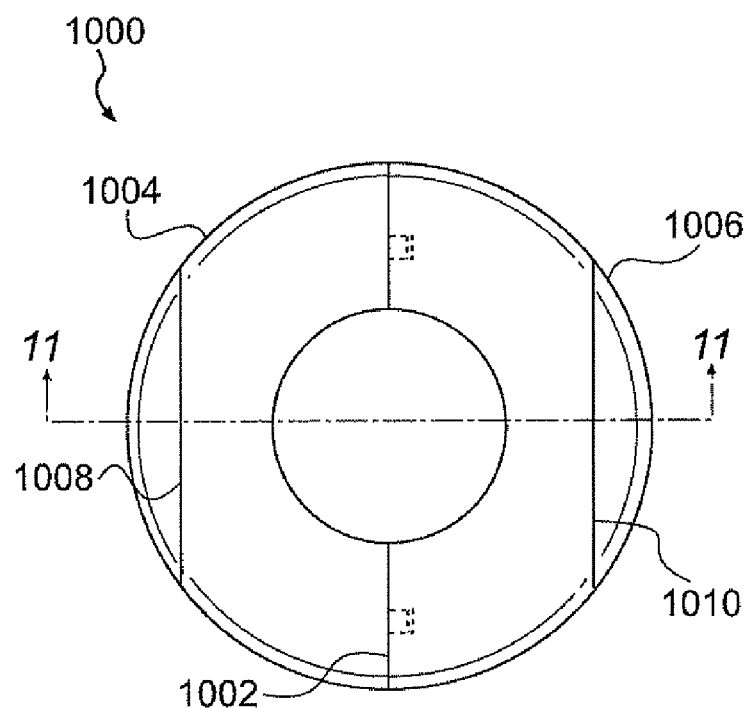
FIG. 10 is an end view of the male member disclosed in FIGS. 8 and 9 taken in the direction of arrow "A" in FIG. 9.

FIG. 10 where an end view taken along directional arrow "A" in FIG. 9 and discloses an end portion 1000 of a male member including a separation line 1002 of two mating halves 1004 and 1006 of a male tubular member. In this view the truncated edges 1008 and 1010 of the end or base mounting member 1000 is easily visualized.

Figure 11:
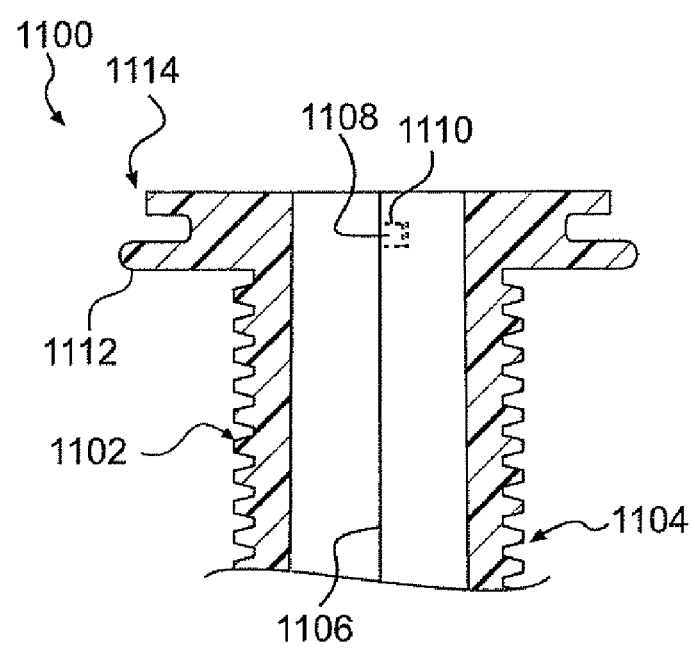
FIG. 11 is a partial cross-sectional view of an end portion of the male member disclosed in FIGS. 8 through 10 taken along section lines 11-11 in FIG. 10.

FIG. 11 is a cross-sectional side view of the end segment 1000 taken along section lines 11-11 in FIG. 10. This view discloses two halves 1102 and 1104 of the male tubular member such as shown in FIG. 8. In this view a division line 1106 between the two joining male segments is shown as well as a registry column 1108 and corresponding recess 1110 is illustrated. In addition a circular connecting or mounting arm 1112 is shown extending parallel with a truncated arm 1114. This feature is clearer when viewed in In contrast to the male tubular member of FIGS. 8-11 corresponding female tubular members are shown in FIGS. 12-18. In this, FIG. 12 shows a tubular female member 1200 composed with two laterally joining elongate body portions 1202 and 1204. A longitudinally extending dividing line 1206 illustrates the two halves that are joined together to make the tubular female member. An end or base member 1208 in this embodiment is formed from two portions 1210 and 1214 that includes a circular mounting ring 1216 and another circular mounting ring 1218 that has truncated side edges as will be discussed more particularly with respect to FIG. 16 below. The two halves of the tubular female member are held together by a locking sleeve 1220 which in this embodiment is coextensive with the two tubular female member halves. In other embodiments the longitudinal length of the locking sleeve 1220 may be shortened and may be formed from one or more rings or collars around the halves of the female tubular member 1200.

Another view of the female tubular member depicted in FIG. 12 as 1200 is shown in FIG. 13 as 1300 in a position rotated 90 degrees about a longitudinal axis of the female tubular member 1300. In this view the circular nature of the base or end mounting member 1302 is shown and again a cylindrical securing or locking sleeve 1304 is slid over two halves of the female tubular member to hold the two together. The longitudinal extent of this sleeve may be coextensive with the tubular portion of the female member as shown or may be composed with one or more rings as discussed above.

FIG. 14 shows a cross-sectional view of a female tubular member 1400 taken along section line 14-14 in FIG. 12. In this view a female tubular elongate body 1402 is shown with an internal thread 1404 which may be a single, double or triple run of simultaneous threads and is designed to cooperate external threads on a male tubular member. A columnar registry element 1406 is shown on either side of a wall portion of the female elongate body portion and an elongate registry member 1408 is shown on either side of the side wall at the other end of the female elongate body portion near a base 1410 of the female portion. A sleeve 1412 surrounds the elongate female portion and serves to hold two female halves together as discussed above.

FIG. 15 shows an end view taken in the direction of arrow "B" in FIG. 14 and discloses a tubular female member 1500 with a scalloped exterior configuration 1502 on each half 1504 and 1506 of the female member. A cylindrical sleeve 1508 is positioned around and over the two halves 1504 and 1506 and serves to hold the elongate body portions of the female member together in operation. The base 1510 extends radially outwardly of the cylindrical sleeve 1508. In this embodiment shown in FIG. 15 the base is divided in the same plane as each of the halves of the female member as shown by division lines 1512 on the female parts and 1514 on the base. The external scallops of the surface of the female halves facilitate sliding application of the sleeve 1508 along the two halves when placed in registry.

FIG. 16 is an end view similar to FIG. 15 but taken in the direction of arrow "C" on the right hand side of FIG. 14. In this view a female member 1600 is shown divided along lines 1602 and 1604. A base unit or element is shown with outwardly opposing cutout portions 1608 and 1610 from a circular engagement locking rim 1612. This rim slides under opposing extension arms 508 in FIG. 5 and serves to lock the female tubular member into a bearing plate or element as discussed above.

FIGS. 17 and 18 disclose first and second elongate body portions or halves 1700 and 1800 respectively of a female tubular member. The elongate body member 1700 in this embodiment includes raised column registry members 1702 and 1704 at one end of the elongate member and raises elongate members 1706 and 1708 at the other. A complete base element 1710 is connected at one end of the elongate member opposite to the threaded end 1712. This base has a first circular bearing rim 1714 and a second circular bearing rim 1716 with truncated sides 1718 and 1720 to fit within a slot of a bearing member 500 shown in FIG. 5 as illustrated in FIG. 3.

In FIG. 18 the other half 1800 of the female tubular member is disclosed and is designed to fit onto the elongate body portion 1700 in the general direction of arrow "D". In this connection the threads 1802 have a pitch and number of simultaneous thread runs to match with the threads 1712 and together correspond with a matching thread pattern on a cooperating male member of a void filler such as illustrated in FIGS. 8 and 9 and discussed above. Cylindrical holes 1802 and 1804 are formed on opposing edges of the elongate body member 1800 and are dimensioned to cooperate with and snuggly receive columns 1702 and 1704 respectively. In a similar vein slots 1806 and 1808 are formed within the other end of the side walls of the elongate body member 1800 and are dimensioned to cooperate with corresponding elongate raised portions 1706 and 1708 respectively on female elongate body member 1700.

FIGS. 19 and 20 are similar to FIGS. 17 and 18 but in this instance the two opposing first and second elongate body portions 1900 and 2000 are the same except for being a mirror image and the registry members used. In this, registry members 1902, 1904 and 1906 are column and elongate raised members and corresponding recess portions 2002, 2004 and 2006 are fashioned into the side walls of body member 2000. In operation the two opposing first and second elongate body portions are joined together as illustrated by directional arrow "E" and are then held snuggly in the operative position of a female tubular member by the application of a surrounding sleeve member.

Turning now to FIGS. 21-26 there are various embodiments of sleeve members that are operable to advantage in the subject invention. FIG. 21 discloses the simplest version of a sleeve 2100 which is composed entirely of a right cylindrical tube 2102 with a uniform thickness circular side wall 2104. This tube may be slid over and surround opposing halves 2202 and 2204, note FIG. 22, comprising first and second elongate body portions of a female tubular member.

In FIG. 23 an alternatively preferred form of the invention sleeve is disclosed which includes a right octagon shaped, tubular sleeve 2300 having a plurality of raised longitudinally extending ridges 2302 which serve as stiffening elements and means for enhancing the grip qualities of the sleeve 2300. In this embodiment the sleeve is shown in FIG. 24 mounted about a correspondingly shaped pare of opposing first and second elongate body portions 2402 and 2404 of a female tubular member with an octagonal exterior configuration.

Figure 25:
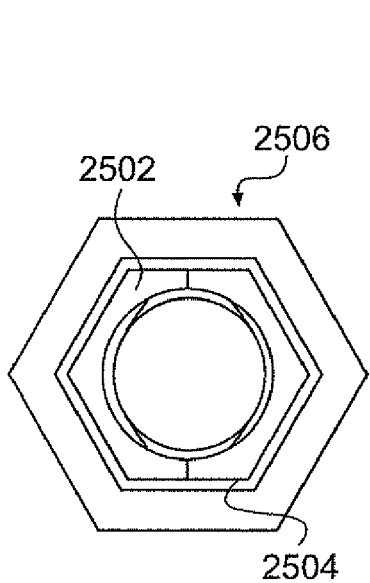
FIG. 25 is an end view of an alternative locking sleeve and female member combination that is hexagonal in cross-sectional configuration.
Figure 26:
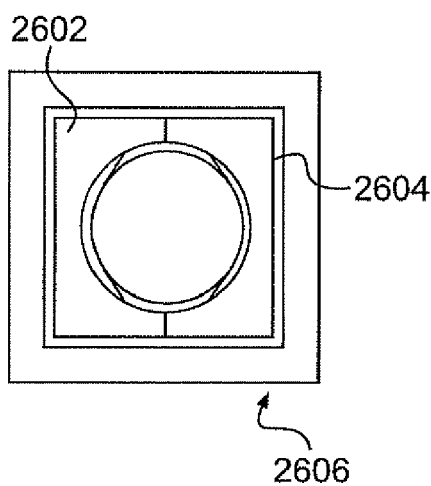
FIG. 26 is an end view of an alternative locking sleeve and female member combination that is square in cross-sectional configuration.

FIGS. 25 and 26 disclose similar views as illustrated in FIGS. 22 and 24 with the exception that in FIG. 25 opposing first and second elongate body portions 2502 and 2504 form a hexagon in exterior configuration and a surrounding sleeve 2506 has a similar internal configuration. Similarly, FIG. 26 discloses a pair of opposing first and second elongate body portions 2602 and 2604 that have in combination a square external configuration when held together by a square sleeve 2606. Still further the external and internal configurations of the sleeve and first and second elongate body portions could be shaped in the form of a triangle in cross section (not shown).

Figure 27:
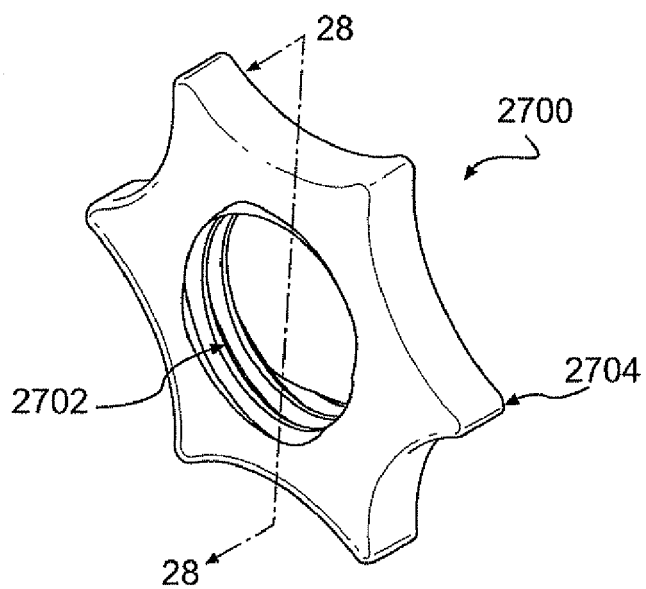
FIG. 27 is a perspective view of a locknut used in connection with the invention as shown in FIGS. 3 and 4 for retaining a split male member together and locking a positioned void filler unit in a final position.

FIG. 27 is a perspective view of a locknut 2700 such as the one labeled 412 in FIG. 4, Threads 2702 correspond to the threads of a male tubular member, such as element 402. Contours 2704 allow the locknut be to turned into place by hand and may take a variety of forms. The locknut may also be shaped to correspond to a turning tool and tightened into place with that tool.

Figure 28:
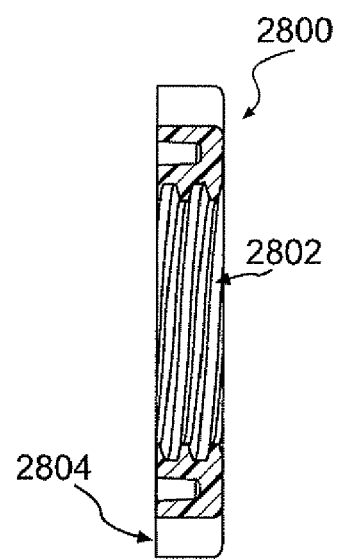
FIG. 28 is a cross-sectional side view of the locknut shown in FIG. 27 taken along section lines 28-28 in FIG. 27.

FIG. 28 is a cross sectional side view of a lock nut 2800 taken along section line 28-28 in FIG. 27. This is the same locknut, labeled 2700 in FIG. 27. Threads 2802 and contours 2804 correspond to those described above regarding FIG. 17.

A method of application of the modular components of the subject disclosure is specifically and inherently disclosed in the above detailed specification. There is no particular order implied in the steps of the method and they can be performed in any suitable order. In one embodiment, the base member is attached to a male tubular member and is placed flush with a piece of cargo or another surface in the transport container. While this is held in place, the female tubular member with attached base is turned in relation to the male tubular member. This extends the female tubular member toward another surface or cargo in the transport container. The female tubular member is turned until the second base member is in contact with the opposing surface and tightened sufficiently. A locknut on the male member is then turned into position to secure the void filler at the desired length.

This method is not exhaustive and can be practiced on any of the embodiment described above. The void filler will be extended using the selected extension mechanism and held in place.

Use of the terms first and second are expressions of differentiation and while first has been used with respect to a male member in the specification above and second in connection with a female member there is no structural significance intended by this designation and the first member may be designated as the female member and the second a male member. In the claims that follow and define the scope of the invention to be covered the term "means for" a recited function is intended to be an expansive term and includes all structure or steps specifically recited in the specification and in addition all equivalent structure or steps capable of performing the recited function that one of skill in the art knows about now or that may be envisioned in the future for performing the recited function.

The preceding description has been presented only to illustrate and describe the invention and some examples of its implementation. It is not intended to be exhaustive or to limit the invention to any precise form disclosed. Many modifications and variations are possible and would be envisioned by one of ordinary skill in the art in light of the above teaching.

The various aspects were chosen and described in order to best explain principles of the invention and its practical applications. The preceding description is intended to enable others skilled in the art to best utilize the invention in various embodiments and aspects and with various modifications as are suited to the particular use contemplated. It is intended that the scope of the invention be defined by the following claims; however, it is not intended that any order be presumed by the sequence of steps recited in the method claims unless a specific order is directly recited.

What is claimed is:

1. Apparatus for stabilizing cargo within a transport container having opposing side walls, said apparatus comprising:
   a male tubular member having a body portion with a first end and a second end,
   a first bearing member connected to said male tubular member at said first end thereof, said first bearing member being operable to react against at least one of cargo to be stabilized and at least one of other cargo to be stabilized and a side wall of the container;
   a female tubular member having a first end and a second end and being dimensioned to cooperate with said male tubular member, said female tubular member being formed from,
      a first elongate body portion formed by one half of a longitudinally divided cylinder,
      a second elongate body portion formed by another half of the longitudinally divided cylinder and together the two halves form said female tubular member and
      a cylindrical sleeve positioned over and extending along at least a portion of the two halves of the longitudinally divided cylinder for maintaining engagement of the two longitudinally divided cylinder halves together to form said female tubular member;
   a second bearing member connected to said female tubular member at said first end thereof, said second bearing member being operable to react against at least one of cargo to be stabilized and a side wall of the container; and
   the second end of said female tubular member being configured to cooperatively receive the second end of said male tubular member and being operative to permit said male tubular member to selectively translate with respect to said female tubular member to extend or contract opposing relative positions of said first and second bearing members thus stabilizing cargo within the container by extending and filling the space between cargo and at least one of an opposing surface of other cargo and a wall surface within the transport container.

2. Apparatus for stabilizing cargo within a transport container as defined in claim 1, wherein
   said cylindrical sleeve extends along the entire length of an exterior surface of said first and second elongate body portions of said female tubular member.

3. Apparatus for stabilizing cargo within a transport container as defined in claim 2, wherein:
   said cylindrical sleeve is circular in cross-section and coextensive with the longitudinal length of said first and second elongate body portions of said female tubular member.

4. Apparatus for stabilizing cargo within a transport container as defined in claim 2, wherein:
   said cylindrical sleeve conforms in cross-sectional configuration to the cross-section of a combination of said first and second elongate body portions of said female tubular member.

5. Apparatus for stabilizing cargo within a transport container as defined in claim 2, wherein:
   said first and second elongate body portions of said female tubular member and said cylindrical sleeve are octagonal in external cross-sectional configuration.

6. Apparatus for stabilizing cargo within a transport container as defined in claim 2, wherein:
   said first and second elongate body portions of said female tubular member and said cylindrical sleeve are hexagonal in external cross-sectional configuration.

7. Apparatus for stabilizing cargo within a transport container as defined in claim 2, wherein:
   said first and second elongate body portions of said female tubular member and said cylindrical sleeve are square in external cross-sectional configuration.

8. Apparatus for stabilizing cargo within a transport container as defined in claim 1 and further comprising:
   means for facilitating selective translation between said male and female tubular members wherein said apparatus for stabilizing is operable to be placed between and firmly engage cargo to be stabilized and at least one of opposing cargo to be stabilized and an internal wall of a transport container for stabilizing cargo within a container.

9. A modular apparatus for stabilizing cargo within a transport container as defined in claim 1 and further comprising:
   external threads formed on an exterior surface of at least a longitudinal portion of said male tubular member; and
   corresponding internal threads formed on an interior surface of at least a longitudinal portion of said female tubular member, starting at the second end of said female tubular member wherein said apparatus for stabilizing is operable to be placed between and firmly engage cargo to be stabilized and at least one of opposing cargo to be stabilized and an internal wall of a transport container for stabilizing cargo within a container.

10. A apparatus for stabilizing cargo within a transport container as defined in claim 9 and further comprising:
    a locking member mounted upon said male tubular member for securing the longitudinal position said female tubular member with respect to said male tubular member.

11. Apparatus for stabilizing cargo within a transport container as defined in claim 10 wherein said locking member comprises:
    a locknut threaded onto said male tubular member for abutting against the second end of said female tubular member.

12. Apparatus for stabilizing cargo within a transport container as defined in claim 1 and further comprising:
    at least one register member extending between said first and second elongate body portions of said female tubular member for aligning said first and second elongate body portions to form said cylindrical female tubular member.

13. Apparatus for stabilizing cargo within a transport container as defined in claim 12 wherein said at least one register member comprises:
- at least one raised column portion positioned upon a side wall of at least one of said first and second elongate body portions; and
- a corresponding columnar recess positioned upon an opposing side wall of the other of said first and second elongate body portions.

14. Apparatus for stabilizing cargo within a transport container as defined in claim 13 wherein said at least one register member comprises:
- at least one raised column portion positioned upon each of opposing edges of side walls of at least one of said first and second elongate body portions; and
- a corresponding columnar recess positioned upon each of opposing edges of the side walls of the other of said first and second elongate body portions.

15. Apparatus for stabilizing cargo within a transport container as defined in claim 12 wherein said at least one raised portion comprises:
- at least one raised elongate strip portion positioned upon at least one of a side wall of at least one of said first and second elongate body portions; and
- a corresponding elongate channel portion fashioned within an opposing edge of a side wall of the other of said first and second elongate body portions.

16. Apparatus for stabilizing cargo within a transport container as defined in claim 15 wherein said at least one raised portion further comprises:
- at least one raised column extending from a side wall portion of at least one of said first and second elongate body portions; and
- at least one corresponding columnar recess within a side wall of an opposing side wall of said first and second elongate body portions.

17. Apparatus for stabilizing cargo within a transport container as defined in claim 1 wherein said female tubular member further comprises:
- an end element connected to said first end of at least one of said first and second body portions and being operable to secure said female tubular member to said second bearing member.

18. Apparatus for stabilizing cargo within a transport container as defined in claim 1 wherein said female tubular member further comprises:
- an end element having,
  - a first portion connected to said first end of said first elongate body portion; and
  - a second portion connected to said first end of said second body portion and being operable in combination with said first portion to secure said female tubular member to said second bearing member.

19. Apparatus for stabilizing cargo within a transport container as defined in claim 1 wherein said male tubular member comprises:
- a first elongate body portion formed by one half of a longitudinally divided cylinder;
- a second elongate body portion formed by another half of the longitudinally divided cylinder and together the two halves form said male tubular member; and
- a register connected to one of said first elongate body portion and said second elongate body portion for maintaining alignment of said first elongate body portion with said second elongate body portion such that said first and second body portions together form said male tubular member.

20. Apparatus for stabilizing cargo within a transport container as defined in claim 19 wherein said male tubular member further comprises:
- an end element connected to said first end of at least one of said first and second elongate body portions and being operable to secure said male tubular member to said first bearing member.

21. Apparatus for stabilizing cargo within a transport container as defined in claim 19 wherein said male tubular member further comprises:
- an end element having,
  - a first portion connected to said first end of said first elongate body portion; and
  - a second portion connected to said first end of said second elongate body portion and being operable in combination with said first portion to secure said male tubular member to said second bearing member.

22. Apparatus for stabilizing cargo within a transport container having opposing side walls, said apparatus comprising:
- a male tubular member having a body portion with a first end and a second end, external threads formed on the exterior surface of at least a longitudinal portion of said male tubular member;
- a first bearing member connected to said tubular male member at said first end thereof, said first bearing member being operable to react against at least one of cargo to be stabilized and at least one of other cargo to be stabilized and a side wall of the container;
- a female tubular member having a first end and a second end and being dimensioned to cooperate with said male tubular member, said female tubular member being formed from,
  - a first elongate body portion formed by one half of a longitudinally divided cylinder,
  - a second elongate body portion formed by another half of the longitudinally divided cylinder and together the two halves form said female tubular member,
  - at least one register member extending between said first and second elongate body portions for aligning said first and second elongate body portions to form a cylindrical tubular female member,
  - internal threads formed on the interior surface of at least a longitudinal portion of said female tubular member starting at the second end of said female tubular member and being operable to cooperate with the external threads on said male tubular member; and
  - a cylindrical sleeve positioned around and substantially coextensive with the length of said first and second elongate body portions of said female tubular member for retaining said first and second elongate body portions together to form the cylindrical female member;
- a second bearing member connected to said female tubular member at said first end thereof, said second bearing member being operable to react against at least one of cargo to be stabilized and at least one of other cargo to be stabilized and a side wall of the container; and
- the second end of said female tubular member being configured to cooperatively receive the second end of said male tubular member and being operative to permit said tubular male member to selectively translate with respect to said tubular female member to extend or contract relative positions of said first and second bearing members thus stabilizing cargo within the container by extending and filling the space between opposing surfaces of cargo and side wall surfaces within the transport container.

23. Apparatus for stabilizing cargo within a transport container as defined in claim 22 wherein:
said first and second elongate body portions of said female tubular member and said cylindrical sleeve are octagonal in external cross-sectional configuration.

24. Apparatus for stabilizing cargo within a transport container as defined in claim 22 wherein:
said first and second elongate body portions of said female tubular member and said cylindrical sleeve are hexagonal in external cross-sectional configuration.

25. Apparatus for stabilizing cargo within a transport container as defined in claim 22 wherein:
said first and second elongate body portions of said female tubular member and said cylindrical sleeve are square in external cross-sectional configuration.

26. Apparatus for stabilizing cargo within a transport container as defined in claim 22 wherein said at least one register member comprises:
at least one raised column portion positioned upon each of the side walls of at least one of said first and second elongate body portions; and
a corresponding columnar recess positioned upon an opposing edge of the side walls of the other of said first and second elongate body portions.

27. Apparatus for stabilizing cargo within a transport container as defined in claim 22 wherein said at least one register member comprises:
at least one raised elongate strip portion positioned upon at least one of the side walls of at least one of said first and second elongate body portions; and
a corresponding elongate channel portion fashioned within an opposing edge of the side walls of the other of said first and second elongate body portions.

28. Apparatus for stabilizing cargo within a transport container as defined in claim 27 wherein said at least one register member further comprises:
at least one raised column extending from at least one of said first and second elongate body portions; and
at least one corresponding columnar recess within an opposing portion of said first and second elongate body portions.

29. Apparatus for stabilizing cargo within a transport container as defined in claim 22 wherein said female tubular member further comprises:
an end element connected to said first end of at least one of said first and second body portions and being operable to secure said female tubular member to said second bearing member.

30. Apparatus for stabilizing cargo within a transport container as defined in claim 22 wherein said female tubular member further comprises:
an end element having,
a first portion connected to said first end of said first body portion; and
a second portion connected to said first end of said second body portion and being operable in combination with said first portion to secure said female tubular member to said second bearing member.

31. Apparatus for stabilizing cargo within a transport container as defined in claim 22 wherein said male tubular member further comprises:
an end element connected to said first end of at least one of said first and second elongate body portions and being operable to secure said male tubular member to said first bearing member.

32. Apparatus for stabilizing cargo within a transport container as defined in claim 22 wherein said male tubular member further comprises:
an end element having,
a first portion connected to said first end of said first body portion; and
a second portion connected to said first end of said second body portion and being operable in combination with said first portion to secure said male tubular member to said second bearing member.

33. Apparatus for stabilizing cargo within a transport container having opposing side walls, said apparatus comprising:
a male tubular member having a body portion with a first end and a second end,
a first bearing member connected to said male tubular member at said first end thereof, said first bearing member being operable to react against cargo to be stabilized and at least one of other cargo to be stabilized and a side wall of the container;
a female tubular member having a first end and a second end and being dimensioned to cooperate with said male tubular member, said female tubular member being formed from,
a first elongate body portion,
a second elongate body portion, and
a cylindrical sleeve positioned over and extending along at least a portion of the first and second body portions for maintaining engagement of the two body portions together to form said female tubular member;
a second bearing member connected to said tubular female member at said first end thereof, said second bearing member being operable to react against at least one of cargo to be stabilized and a side wall of the container; and
the second end of said tubular female member being configured to cooperatively receive the second end of said tubular male member and being operative to permit said tubular male member to selectively translate with respect to said tubular female member to extend or contract opposing relative positions of said first and second bearing members thus stabilizing cargo within the container by extending and filling the space between cargo and at least one of an opposing surface of other cargo and a wall surface within the transport container.

34. Apparatus for stabilizing cargo within a transport container as defined in claim 33 wherein said at least one register member comprises:
at least one raised column portion positioned upon each of the side walls of at least one of said first and second elongate body portions; and
a corresponding columnar recess positioned upon and opposing edge of the side walls of the other of said first and second elongate body portions.

35. Apparatus for stabilizing cargo within a transport container as defined in claim 34 wherein said at least one register member comprises:
at least one raised column portion positioned upon each of the side walls of at least one of said first and second elongate body portions; and
a corresponding columnar recess positioned upon an opposing edge of the side walls of the other of said first and second elongate body portions.

36. Apparatus for stabilizing cargo within a transport container as defined in claim 33 wherein said at least one raised portion comprises:

at least one raised elongate strip portion positioned upon at least one of the side walls of at least one of said first and second elongate body portions; and a corresponding elongate channel portion fashioned within an opposing edge of the side walls of the other of said first and second elongate body portions.

37. Apparatus for stabilizing cargo within a transport container as defined in claim 36 wherein said at least one raised portion further comprises:

at least one raised column extending from a side wall portion of at least one of said first and second elongate body portions; and at least one corresponding columnar recess within a side wall of an opposing other of said first and second elongate body portions.

38. Apparatus for stabilizing cargo within a transport container, said apparatus comprising:

a male tubular member having a body portion with a first end and a second end, a first bearing member connected to said male tubular member at said first end thereof, said first bearing member being operable to react against at least one of cargo to be stabilized and at least one of other cargo to be stabilized and a side wall of the container;

a female tubular member having a first end and a second end and being dimensioned to cooperate with said male tubular member, said female tubular member being formed from, a first elongate body portion, a second elongate body portion, an end element having, a first portion connected to said first end of said first body portion, and a second portion connected to said first end of said second body portion and being operable in combination with said first portion to secure said female tubular member to said second bearing member, and a cylindrical sleeve positioned around and extending along at least a portion of the two halves of the longitudinally divided cylinder for maintaining engagement of the two longitudinally divided cylinder halves together to form said female tubular member;

a second bearing member connected to said end element of said female tubular member at said first end thereof, said second bearing member being operable to react against at least one of cargo to be stabilized and a side wall of the container; and the second end of said female tubular member being configured to cooperatively receive the second end of said male tubular member and being operative to permit said male tubular member to selectively translate with respect to said female tubular member to extend or contract opposing relative positions of said first and second bearing members thus stabilizing cargo within the container by extending and filling the space between cargo and at least one of an opposing surface of other cargo and a wall surface within the transport container.

\* \* \* \* \*